United States Patent [19]
Rogge

[11] 3,807,758
[45] Apr. 30, 1974

[54] RETRACTABLE STEP FOR A MOTOR HOME

[76] Inventor: Gail E. Rogge, 23851 Lyon St., San Jacinto, Calif. 92383

[22] Filed: July 31, 1972

[21] Appl. No.: 276,450

[52] U.S. Cl. ................................. 280/166, 182/88
[51] Int. Cl. ............................................. B60n 3/02
[58] Field of Search ....... 280/166, 164, 163; 182/88

[56] References Cited
UNITED STATES PATENTS

| | | | |
|---|---|---|---|
| 1,428,030 | 9/1922 | Heaton | 280/166 |
| 2,583,893 | 1/1952 | Shuck | 280/166 |
| 3,229,993 | 1/1966 | Riddle | 280/166 |
| 3,671,058 | 6/1972 | Kent | 280/166 |

Primary Examiner—Robert R. Song
Attorney, Agent, or Firm—Christie, Parker & Hale

[57] ABSTRACT

A self-contained unit including a frame which is adapted to be secured to the bottom of the vehicle below the door and a step which slides in and out of the frame between a retracted and extended position. A single guide portion in the center of the step slidably engages a guide member secured to the frame below the step for guiding movement of the step between its two positions. Stop means mounted at the inboard corners of the step engage the upper part of the frame when the step is extended, any downward force applied to the step in the extended position being transferred to the frame through the stop means with the end of the guide member acting as a fulcrum. Linkage means supported by the frame is pivotally connected to the step along the line of the guide member and is actuated by the opening and closing of the door.

9 Claims, 4 Drawing Figures

PATENTED APR 30 1974

RETRACTABLE STEP FOR A MOTOR HOME

FIELD OF THE INVENTION

This invention relates to a retractable door step for automobiles.

BACKGROUND OF THE INVENTION

With the great increase in the popularity of motor homes, van campers, and similar vehicles having a door opening along the side which is used for stepping into and out of the interior of the vehicle, there is developed a need for a retractable step assembly which is self-contained, easily installed out of the way beneath the vehicle, and which can be readily linked to the door such that the step is easily extended and retracted as the door is opened and closed. Such assembly must be rugged, and fool-proof in its operation. It must not bind and yet must not require lubrication or other maintenance to keep it freely operating in spite of being exposed to weather and other hazards of the road.

SUMMARY OF THE PRESENT INVENTION

The present invention is directed to an improved retractable door step assembly for installation in motor homes, trailers, campers, and other types of vehicles in which the passenger enters through a door and remains in a standing position inside the vehicle. The retractable step assembly of the present invention provides improved operation by separating the guiding and load-supporting function of the movable step. The step assembly utilizes a single centrally positioned guide, which eliminates the possibility of jamming or binding of the step retracting mechanism. Unique linkage transfers a force from the door as it is opened and closed through a linkage which is pivotally joined to the movable step at a point along the line of the guide means so that the force transmitted to the step is free of any force moment which would tend to cock or bind the step in its movement along the guide member.

DESCRIPTION OF THE DRAWINGS

For a better understanding of the invention reference should be made to the accompanying drawings wherein.

DETAILED DESCRIPTION

Figure 1:
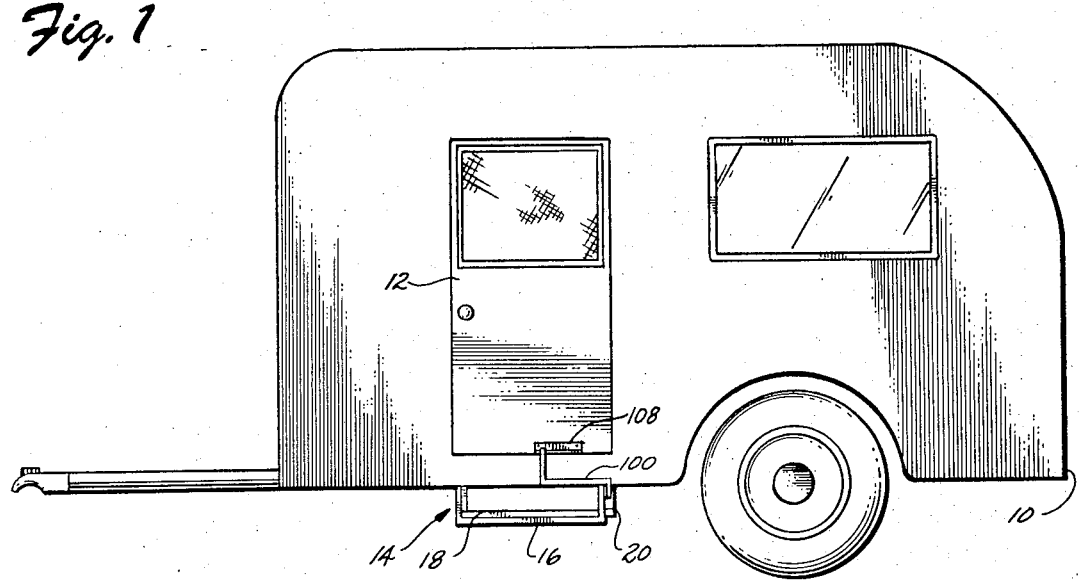
FIG. 1 is an elevational view of a vehicle with the retractable step assembly mounted in operative position.

Referring to FIG. 1, there is shown, by way of example, a trailer vehicle 10 having a side door for entering and leaving the trailer. The step assembly, indicated generally at 14, is mounted beneath the trailer and includes an outer frame 16 which is rigidly secured to the underside of the vehicle below the door, and a retractable step 18 within the frame. A linkage assembly 20, hereinafter described in detail, is supported on the frame 16 and provides linkage between the step 18 and the door 12, such that opening and closing the door 12 causes the step 18 to move in and out of the frame 16 between the retracted and extended positions.

Figure 2:
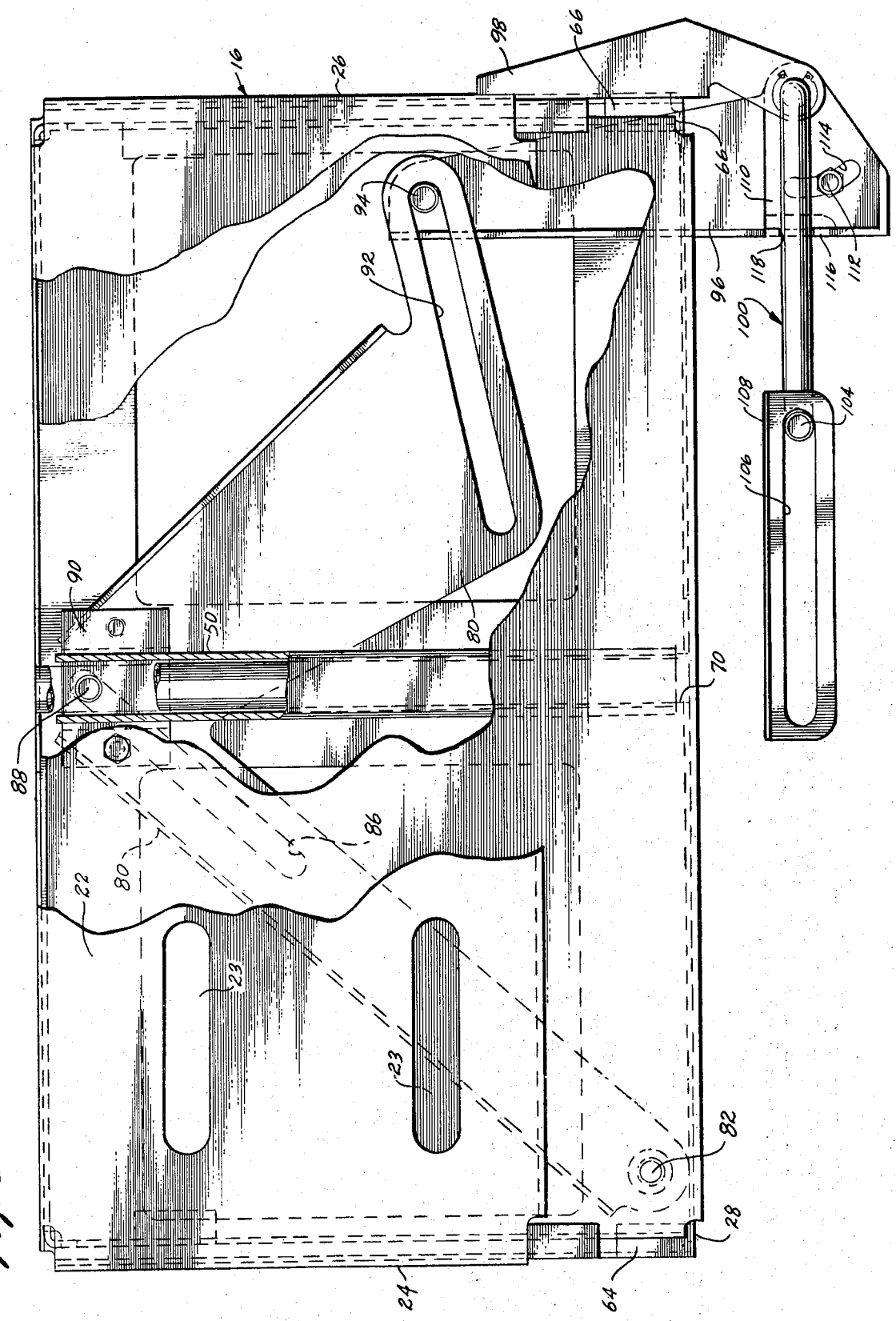
FIG. 2 is a top view partially cut away and partially in section of the step assembly with the step in the retracted position.
Figure 3:
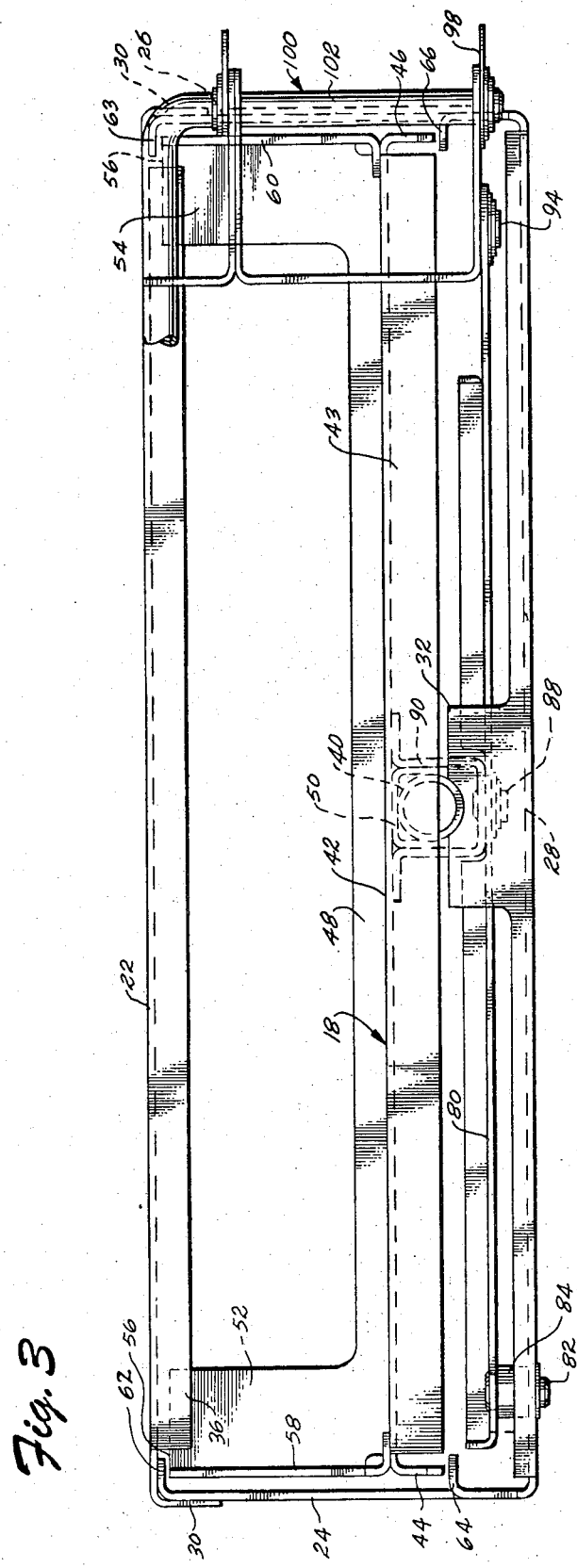
FIG. 3 is a front view of the step assembly.
Figure 4:
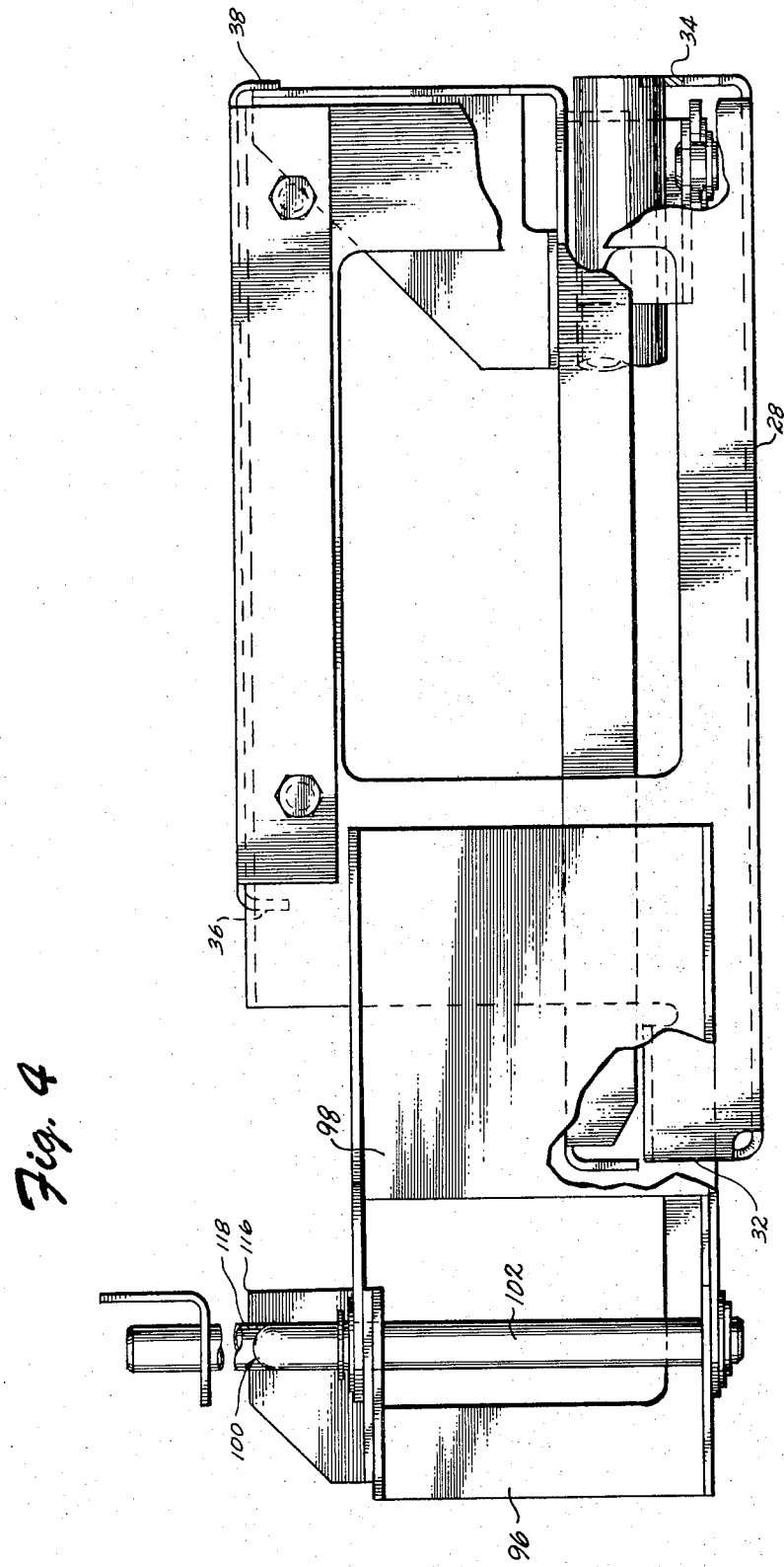
FIG. 4 is an end view of the step assembly.

Referring to FIGS. 2-4, details of the self-contained retractable step assembly 14 are shown in detail. The frame 16 is substantially in the form of a rectangular box having a top wall 22 which is bolted or otherwise secured to the underside of the vehicle beneath the sill of the door 12 by means of slots 23 in the top wall through which bolts (not shown) extend. The frame includes side walls 24 and 26 and a bottom wall 28. The bottom wall 28 and side walls 24 and 26 are preferably integrally formed out of a single sheet of metal. The top wall 22 is separately formed with overlapping flanges or lips 30 which extend down over the sides 24 and 26 and are welded or otherwise secured to the side walls to form an integral structure. The front and back margins of the bottom wall 28 of the frame are formed with upturned edges 32 and 34 which stiffen the bottom wall. Similarly the top wall 22 is formed with integral flanges 36 and 38 along the front and back margins respectively for providing rigidity to the top wall.

The frame 16 is provided with a cylindrical tubular guide member 40 which is secured at either end to the front and rear flange portions 32 and 34 of the bottom wall 28 and extends along the centerline half way between the side walls 24 and 26. The tubular guide member 40 is positioned about the bottom wall 28 with a space between the guide member and the bottom wall.

The retractable step 18 is movably supported by the frame 16 between the upper wall 22 and lower wall 28 of the frame. The step member 16 includes a flat tread portion 42 made of heavy gage sheet metal. The forward margin of the step is turned downwardly to form a lip or flange 43 for stiffening the step. Similarly the edges of the step are turned downwardly to form flanges 44 and 46 on either side of the step while the back edge is turned upwardly to form a stiffening flange or lip 48.

Support and guidance for the step 16 are provided by a channel member 50 secured to the underside of the flat tread portion 42 of the step. The channel member extends along the centerline half way between the side flanges 44 and 46. The channel member is arranged to fit over the tubular guide member 40 associated with the frame 16. Channel 50 fits over and freely slides along the tubular guide member 40, permitting the step to move from an inner or retracted position within the frame to an outwardly or extended position in which the step projects out of the frame. Outward movement of the step relative to the frame is limited by a pair of stop members positioned at the rear or innermost corners of the step, as indicated at 52 and 54. The stop members are formed by extending the upturned flange 48 at either edge of the step upwardly to a point just below the top wall 22. As best seen in FIG. 3, the upper edge 56 of the step portion 52, when the step is in its operative position engaging the guide member 40, extends above the downward flange 36 of the top 22. Thus forward movement of the step brings the stop member 52 into contact with the lip 36, limiting the movement of the step as it is drawn outwardly from the frame. The upwardly extending portion 52 forming the stop member is formed with a reinforcing side flange 58, the lower margin of which is welded or otherwise secured to the tread surface 42 of the step. The stop member 54 is similarly formed with an integral side flange 60 for stiffening purposes.

By providing a single guide member in the center of the step, the step is free to tilt about the longitudinal axis of the tubular guide member 40. This tilting action is limited by the upper edges 56 of the stop members 52 and 54 which, on slight tilting of the step in either direction, are moved into engagement with inwardly formed lips 62 and 63 at the upper margins of the side walls 24 and 26. Also the side walls 24 and 26 are provided with inwardly extending tabs 64 and 66, respectively, against which the stiffening flanges 44 and 46 along the sides of the step 18 may be moved by the tilting of the step. It should be noted that there is ample clearance between the tab 64 and the lip 62 of the side wall relative to the lower edge of the flange 44 and upper edge 56 of the stop 52 so that the step can move freely, with all guidance being provided by the tubular guide member 40 in cooperation with the guide channel 50.

Referring to FIG. 2, it will be seen that the front flange 32 of the bottom wall of the frame extends outwardly substantially beyond the flange 36 of the upper wall. Thus when the step is extended in its operative stepping position, the outer end 70 of the tubular guide member 40 acts as a fulcrum between a force supplied to the projecting edge of the step, as by a person placing his weight on the step, and the points where the upper edges 56 of the stop members 52 and 54 are urged into engagement with the inward extending flange 62 of the side walls 24 and 26. If the load of the step is applied to the step off center near either of the sides, twisting of the step is limited by the movement of the side flange 44 of the step into engagement with the tab 64 or movement of the flange 46 into engagement with the tab 66. Thus the step and frame, even though made of sheet metal material, is capable of transferring substantial loads anywhere on the step through the frame to the vehicle to which the step assembly is mounted. At the same time, the single guide positioned at the center of the step permits the step to be easily and freely moved inwardly and outwardly from its retracted to its extended positions without any change of binding or wedging even though the frame may be twisted or warped somewhat during mounting or subsequent use. Thus a very light but yet rugged and foolproof arrangement is provided by which the step can be freely moved between a retracted and extended position and yet which is capable of transferring the loads to which the step is subjected in cantilever fashion back through the frame to the vehicle.

Movement of the step between its retracted and extended positions is provided by a linkage arrangement which interconnects the door with the step, the linkage providing a force for moving the step, the force being applied exactly along the centerline of the guide member 40. This linkage includes a first lever arm 80 positioned between the bottom of the frame 28 and the step 18. The first lever arm 80 is pivotally secured to the bottom 28 of the frame 16 by a pivot pin 82 extending through aligned openings in the bottom wall 28 and one end of the lever arm 80. A spacer 84 holds the arm 80 in spaced relationship to the bottom 28. The lever arm 80 is provided with an elongated slot 86 through which extends a pin 88 mounted in fixed relation to the step 18 by a supporting bracket 90. The bracket 90 is bolted or otherwise secured to the tread portion 42 of the step 18, the bracket 90 bridging the space below the guide member 40. The centerline of the pin 88 is aligned with the centerline of the guide member 40 so that rotation of the lever arm 80 about the pivot pin 82 imparts a force to the step 18 through the pin 88 and bracket 90. This force is applied in a direction parallel to the longitudinal axis of the tublar guiding member 40. As the arm 80 is pivoted, the pin 88 slides along the slot 86.

The lever arm 80 extends beneath the guide member 40. The outer end of the arm 80 is provided with a second slot 92 which extends longitudinally along an axis passing through the pivot point at the pin 82. This slot 92 is slidably engaged by a pin 94. The pin 94 is secured to the outer end of the control arm 96 which in turn is pivotally supported from the frame 16 by a bracket support 98. The bracket 98 is welded or otherwise secured to the side wall 26 and extends beyond the forward edge of the bottom wall 28, as best seen in FIG. 2. The control arm 96 is hinged to the bracket support 98 by a crank arm 100 having a vertical portion 102 extending through aligned openings in the bracket 98 and support arm 96. Rotation of the control arm 96 in a counter-clockwise direction, as viewed in FIG. 2, causes the pin 94 to pass through an arc about the axis of the vertical portion 102 of the crank arm 100. In moving through this arc, the pin 94, through engagement with the slot 92, causes the linkage arm 80 to move outwardly of the frame 16 about its pivot pin 82, thereby moving the step 18 outwardly along the guide member 40 by means of the pin 88 engaging the slot 86.

The control arm 96 is rotated by the crank arm 100 in response to the opening and closing of the door 12. To this end, the crank arm 100 has a second vertical section, offset from the vertical section 102, which engages a slot 106 in a guide member 108 which is bolted or otherwise secured to the bottom of the door 12. To provide for variations in the mounting of the frame 16 relative to the plane of the door 12, the crank arm 100 is adjustably coupled to the control arm 96 by a movable stop member 110. Stop member 110 is pivoted on the vertical portion 102 of the crank arm and is adjustably clamped to the control arm 96 by and bolt 112 which extends through a slot 114 in the stop member 110, the bolt 112 extending through the slot 114 and threadedly engaging the control arm 96. The stop arm 110 is formed with a flange portion 116 in which is formed a slot 118 through which the crank arm 100 passes. Thus opening of the car door causes the crank arm 100 to be rotated about the axis of the vertical portion 102. The crank arm transfers rotation to the control arm 96 through the stop member 110. In this manner, movement of swinging open of the door causes the step 18 to move from its retracted position outwardly to an extended position when the door is swung open.

From the above description, it will be seen that the present invention provides a self-contained retractable step assembly which can be easily installed and which automatically is extended and retracted by the opening and closing of the vehicle door. The single guiding arrangement located in the center of the step, with the force being applied to the step for moving the step between its retracted and extended positions lying along the axis of the single guide, eliminates any binding that could restrict the movement of the step. The cantilever load supporting arrangement is separate from the guiding arrangement so that no strain is placed directly on the guiding arrangement which could bend it or distort it so as to interfere with the retracting action of the step.

What is claimed is:

1. A retractable step apparatus for a vehicle having an outwardly swinging door comprising:

a frame adapted to be attached to the underside of the vehicle below the door, a step member supported in the frame for movement along a predetermined path relative to the frame between an extended position substantially forwardly of the frame and a rearwardly retracted position in the frame, the frame including a guide member aligned with and disposed below the step centrally with respect to the path of movement of the step member, the step member carrying means defining centrally of the bottom thereof a guide portion which engages the guide member for support of the step member in the frame and for guiding movement of the step member along the path, step moving means connected to the step member and connectible to the door for moving the step member between its extended and retracted positions in response to opening and closing of the door, the step moving means including linkage means pivotally secured to the step member at a point aligned with the guide member, stop means carried by the step member for engaging the frame to define the extended position of the step member relative to the frame, the guide member having a forward end in the frame forwardly of the location of the frame engaged by the stop means in the extended position of the step member in the frame so that, when the step member is in its extended position, any load applied to the step member forwardly of the forward end of the guide member is transferred to the frame through the stop means with the forward end of the guide member acting as a fulcrum.

2. Apparatus of claim 1 wherein the stop means is mounted on the top side of the step member along the rear edge of the step member, the stop means being moved upwardly into engagement with a portion of the frame by a downward force applied to the front edge of the step member.

3. Apparatus defined in claim 2 wherein the stop means is positioned at the rear corners of the step member to provide widely spaced points of contact with the frame when the step member is in its extended position.

4. Apparatus defined in claim 3 wherein the step member is laterally tiltable about the elongate extent of the guide member, and further including support means secured to the frame on either side adjacent the front of the frame, the support means engaging the step member when the step member is tilted laterally slighly about the guide member.

5. Apparatus as defined in claim 3 wherein the guide member is an elongated member secured to the frame and extending between the front and back of the frame, and said guide portion of the step member fits over and slidably engages the guide member.

6. A foldaway step comprising: a rigid housing having a bottom frame portion and a top frame portion interconnected at opposite side edges thereof by two side frame portions, an elongated guide member mounted in the housing to the bottom frame portion thereof centrally of the side frame portions, a movable step member disposed in the housing, a slide member secured to the bottom of the step member centrally thereof and slidably engaging the guide member, the guide member and the slide member cooperating for guiding the step member relative to the housing between a rearwardly retracted position and a forwardly extended position in which the step member is disposed partially forwardly of a front end of the guide member, the step member carrying a stop adjacent the rear edge thereof which engages the housing for defining the extended position of the step member and for preventing upward movement of the rear of the step member relative to the housing.

7. Apparatus of claim 6 further comprising a crank arm supported by the housing for rotation about a vertical axis, linkage connecting the crank arm to the step member such that rotation of the crank arm moves the step member along the guide member between the retracted and extended positions of the step member.

8. Apparatus of claim 7 wherein said linkage is coupled to the step member at a location aligned with the slide member.

9. Apparatus of claim 8 wherein the step member is laterally tiltable in the housing about the elongate extent of the guide member, and further including support means secured to the housing on either side adjacent the front of the housing, the support means engaging the step member when the step member is laterally tilted about the guide member.

* * * * *

76:HAC

PO-1050
(5/69)

UNITED STATES PATENT OFFICE
CERTIFICATE OF CORRECTION

Patent No. __3,807,758__  Dated __April 30, 1974__

Inventor(s) __Gail E. Rogge__

It is certified that error appears in the above-identified patent and that said Letters Patent are hereby corrected as shown below:

Column 1, lines 26-42, delete the entire paragraph and insert --The present invention is directed to a foldaway step for use on motor homes, travel trailers and the like. The step includes a rigid housing which has a bottom frame portion and a top frame portion which are interconnected at opposite side edges thereof by two side frame portions. An elongated guide member is mounted in the housing to the frame bottom portion centrally of the side frame portions. A movable step member is disposed in the housing. A slide member is secured to the bottom of the step member centrally thereof and slidably engages the guide member. The guide member and the slide member cooperate for guiding the step member relative to the housing between a rearwardly retracted position and a forwardly extended position. In its forwardly extended position, the step member is disposed partially forwardly of the front end of the guide member. The step member carries a stop adjacent the rear edge thereof which engages the housing to define the extended position of the step member and to prevent upward movement of the rear of the step member relative to the housing.--

Column 3, line 44, delete "change" and insert --chance--.

Column 4, line 7, delete "tublar" and insert --tubular--;
line 44, change "and" to --a--.

Column 6, line 7, change "slighly" to --slightly--.

Signed and sealed this 22nd day of October 1974.

(SEAL)
Attest:

McCOY M. GIBSON JR.
Attesting Officer

C. MARSHALL DANN
Commissioner of Patents